Figure 1:
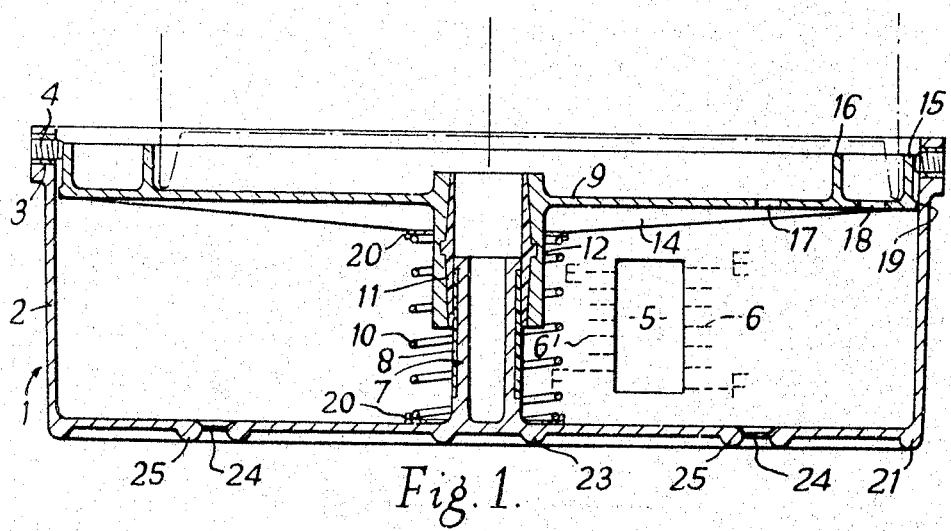

United States Patent Office 3,319,730
Patented May 16, 1967

3,319,730
DEVICE FOR MEASURING CONTENTS OF
LIQUEFIED GAS CONTAINERS
Angus Humphrey Cuddon-Fletcher, Oshkosh, Wis., assignor to The Great Grimsby Coal, Salt and Tanning Company Limited, Grimsby, England
Filed Aug. 11, 1966, Ser. No. 571,906
4 Claims. (Cl. 177—233)

The present invention relates to a device for measuring the contents of containers for liquefied gas.

It is a well-known problem to all users of liquefied hydrocarbon gases that it is impossible to gauge the contents of a container and it is an object of the present invention to provide a simple device, which will permit a reasonably accurate estimate of the contents of a liquefied gas container to be made. It is a further object of the invention to provide for this purpose a device of low initial cost and suitable for prolonged trouble-free service under domestic conditions.

Liquefied gases are supplied for domestic use in caravans and similar purposes in standard metal containers, the standard varying between different suppliers. The present invention is intended to provide a device for estimating the contents of a particular standard container, for which the device is designed, and relies upon weighing the container and its contents.

Since the individual containers of any particular standard design are of substantially equal weight, it follows that the contents of a container may be gauged with sufficient accuracy for practical purposes by a weighing operation, particularly in the case of butane and propane, supplied for domestic use, because the weight of the individual containers is low in relation to the weight of contained gas as compared with the weight of containers of gases which require to be stored under high pressure.

According to the present invention there is provided a device for measuring the contents of a liquefied gas container comprising a base, having an axial guide boss and a peripheral wall, a platform having an upper surface shaped to conform to the base end of a standard container for a liquefied gas and a sleeve-like axial boss fitting over said axial guide boss to guide said platform for vertical movement in said base, a compression spring arranged between the base and the platform and around said sleeve-like axial boss on said platform, an index means on said platform cooperating with a calibrated scale on the base.

The platform, which is guided within the base, is preferably provided with an index mark or pointer, which is visible through a slot or window in the side wall of the base to co-operate with a calibrated scale on the outer surface of the base, the said scale indicating the remaining proportion of the contents of the container.

Since the device of the present invention is primarily intended for use in domestic conditions in which high moisture condensation may be expected to occur from the products of combustion of a hydrocarbon gas, it is preferred to make the device from a plastic material so far as possible. This also makes for economy in production.

Since the gas container is situated substantially symmetrically in relation to the axis of the platform, in normal operation there is substantially no lateral force between the axial boss on the base and the sleeve-like boss on the platform. Since the gas container stands upright on the platform, lateral shock loads of quite large order may be imposed on the platform and, through it, on the axial boss of the base by lateral bumps or shocks on the gas container. For this reason it is preferred to make both base and platform from a tough resilient thermoplastic material, which will resiliently deform, but not break, under lateral shock loads on the gas container.

The invention is hereinafter further described with reference to the accompanying drawings which illustrate a device for measuring the contents of a standard domestic butane container, such as might be employed in a trailer caravan for cooking and water-heating purposes.

Figure 2:
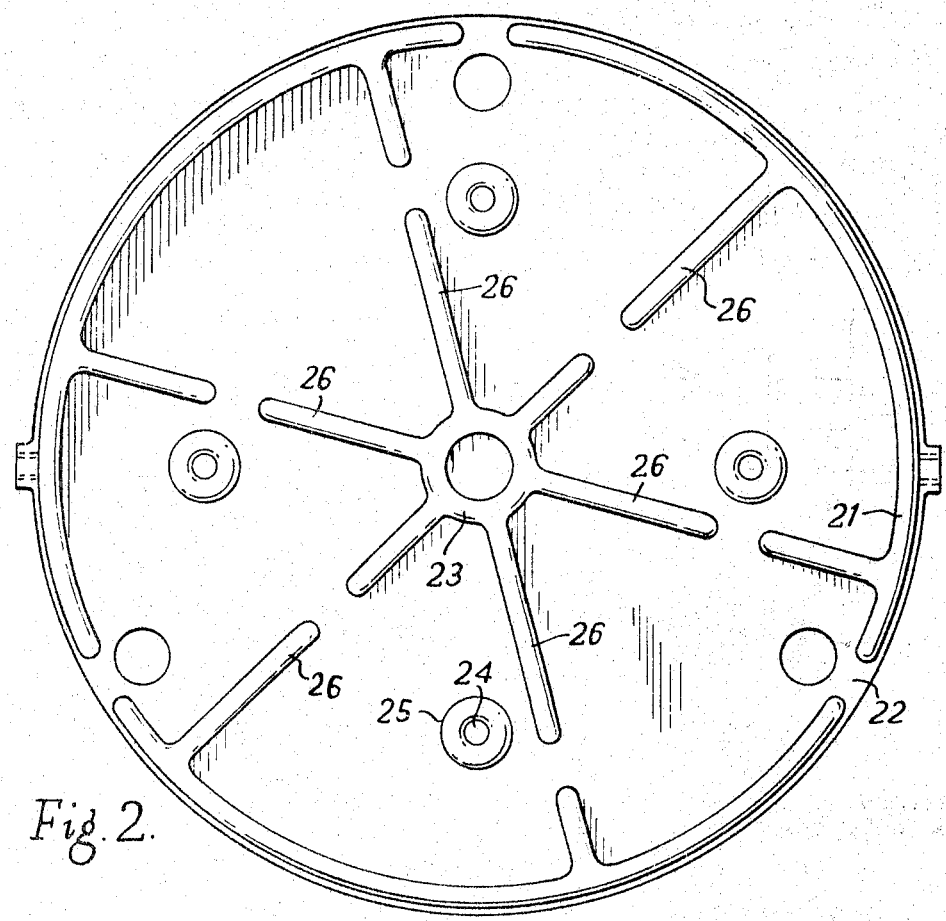

In the drawings:
FIGURE 1 is a vertical section of the device, and
FIGURE 2 is an underneath plan view of the base.

The device shown is intended to be formed, as far as possible, of mouldings in a non-brittle thermoplastic material, high density polythene being the preferred material.

The base 1 is provided with a peripheral side wall 2, into which are moulded two internally screw-threaded inserts 3 which are employed to receive stop studs 4.

In the side wall 2 there are provided one or more windows 5, each of which has two associated scales 6, 6', marked on the outer side of the wall ranging from E (empty) to F (full).

The base 1 is further provided with an axial guide boss 7, in the outer surface of which there is moulded a hard wear-resisting sleeve member 8, which may be metal or suitable hard plastic.

A platform member 9 is arranged to slide on the guide boss 7 and is supported by a compression spring 10. The platform member 9 is provided with a wear-resisting insert sleeve 11, to co-operate with the sleeve member 8 on the base, the sleeve 11 being moulded into a sleeve-like axial boss portion 12. The platform member is provided with a plurality of radial strengthening ribs 14, the purpose of which is to minimize deflection of the periphery of the platform 9 in relation to the axial boss portion 12.

The platform is provided with upstanding ribs 15 and 16 which, as indicated, form sockets to receive the flanged base ends of two different standard liquefied gas containers of similar capacity, part of the bases of which are indicated in broken lines in FIGURE 1.

The platform member 9 is provided with a series of drain holes 17 and 18 positioned inwardly of the rib 16 and between ribs 15 and 16 respectively.

The rib 15 is positioned a small distance inwardly from the periphery of the platform member 9, so that there is a peripheral projecting portion 19, which serves to provide a shoulder for co-operation with the stop studs 4 to hold the platform member 9 in the base. The projecting portion 19 also serves as the index mark for co-operation with the scales 6. Preferably an index line is scribed around its periphery, although it is satisfactory to rely on the edge of the projecting portion 19 as the index mark.

The spring 10 rests in stainless steel washers 20 at its two ends so that it does not bite into the relatively soft plastic material of the base 1 and platform member 9.

As will readily be understood the value of the spring is chosen in relation to the known weight of the gas contents and weight of the gas containers with which it is to be used so as to give a full scale deflection in a vertical travel as nearly equal as possible to the vertical height of the window.

The undersurface of the base 1 (FIGURE 2) is provided with a peripheral rib 21, which is interrupted at 22 for drainage purposes.

A further circular rib 23 is provided adjacent the periphery of the axial boss 7 to provide support for the lower end of the spring 10. A series of screw holes 24, each surrounded by a rib 25, is provided to enable the base to be secured to a floor without causing appreciable distortion of the base.

As can be seen in FIGURE 2, the bottom of the base is provided with a series of radial ribs 26, each of which is interrupted to permit passage of water to the drainage outlets 22, the interruptions to the ribs 22 being at different distances from the centre for strength reasons.

The base member 1 is also provided with a series of drain holes 27 adjacent the interruptions 22 in the rib 21, so that any moisture accumulating within the base 1 can readily escape.

It will be seen that the apparatus has been designed in moisture-resisting material and at the same time is constructed so that all condensate or casually accumulating water is automatically removed from the platform so that it cannot affect the weighing operation of the device. The accumulation of moisture between the base and the platform, which might be detrimental to the spring 10, is also avoided and, lastly, the obviously undesirable accumulation of moisture between the base 1 and a wooden floor, to which it is secured, is also obviated.

I claim:

1. A device for measuring the contents of a liquefied gas container comprising a base, having an axial guide boss and a peripheral wall, a platform having an upper surface shaped to conform to the base end of a standard container for a liquefied gas and a sleeve-like axial boss fitting over said axial guide boss to guide said platform for vertical movement in said base, a compression spring arranged between the base and the platform and around said sleeve-like axial boss on said platform, an index means on said platform co-operating with a calibrated scale on the base.

2. A device according to claim 1, in which the peripheral wall of the base is formed with one or more windows, a calibrated scale being located adjacent one or both vertical edges of such window.

3. A device according to claim 2, in which the platform is provided with an upstanding rib adjacent its periphery to form a socket to receive the base end of one shape of standard gas bottle, a laterally extending rib at the periphery of the platform serving as the index means for co-operation with the calibrated scale on the base.

4. A device according to claim 1, in which both the base and the platform are moulded in a tough resilient plastic material, both the base and the platform having wear-resistant inserts cast into the co-operating surfaces of the axial guide boss on the base and the sleeve-like axial boss on the platform.

References Cited by the Examiner

UNITED STATES PATENTS

| | | | |
|---|---|---|---|
| 1,436,344 | 11/1922 | Hickey | 177—232 X |
| 1,787,352 | 12/1930 | Bensinger | 177—233 X |
| 2,069,499 | 2/1937 | Marin et al. | 177—245 X |

FOREIGN PATENTS 57,097   8/1866   Great Britain.

RICHARD B. WILKINSON, *Primary Examiner.*

G. H. MILLER, *Assistant Examiner.*